US012560270B2

(12) United States Patent
Gorgoglione et al.

(10) Patent No.: US 12,560,270 B2
(45) Date of Patent: Feb. 24, 2026

(54) MITIGATION OF BUCKLING IN SUBSEA PIPE-IN-PIPE SYSTEMS

(71) Applicant: Subsea 7 Limited, Sutton (GB)

(72) Inventors: Davide Gorgoglione, Viroflay (FR);
Jens Fernandez-Vega, Woking (GB);
Arek Bedrossian, Cheam (GB);
Vincent Boulliat, Garches (FR)

(73) Assignee: Subsea 7 Limited, Sutton (GB)

( * ) Notice: Subject to any disclaimer, the term of this patent is extended or adjusted under 35 U.S.C. 154(b) by 562 days.

(21) Appl. No.: 17/784,612

(22) PCT Filed: Dec. 11, 2020

(86) PCT No.: PCT/EP2020/085843
§ 371 (c)(1),
(2) Date: Jun. 10, 2022

(87) PCT Pub. No.: WO2021/116452
PCT Pub. Date: Jun. 17, 2021

(65) Prior Publication Data
US 2023/0011161 A1 Jan. 12, 2023

(30) Foreign Application Priority Data
Dec. 12, 2019 (GB) ...................................... 1918302

(51) Int. Cl.
*F16L 57/02* (2006.01)
*F16L 7/00* (2006.01)
(Continued)

(52) U.S. Cl.
CPC ................. *F16L 57/02* (2013.01); *F16L 7/00* (2013.01); *F16L 9/18* (2013.01); *F16L 13/02* (2013.01);
(Continued)

(58) Field of Classification Search
CPC ..... F16L 57/02; F16L 7/00; F16L 9/18; F16L 13/02; F16L 39/005; F16L 39/04;
(Continued)

(56) References Cited

U.S. PATENT DOCUMENTS 7,234,492 B2 * 6/2007 Bastard ................... F16L 57/02
138/112
11,306,848 B2 4/2022 Hallot et al.
2018/0051539 A1 2/2018 Gerometta et al.

FOREIGN PATENT DOCUMENTS

DE 4211081 C1 * 9/1993 ............. E21B 17/18
FR 2746891 A1 * 10/1997 ............. F16L 39/005
(Continued)

*Primary Examiner* — James M Hewitt, II
(74) *Attorney, Agent, or Firm* — Mattingly & Malur, PC

(57) ABSTRACT

A subsea pipeline of pipe-in-pipe configuration comprises an inner pipe, an outer pipe spaced radially from the inner pipe, and an annulus defined by the radial spacing between the inner and outer pipes. A series of longitudinally spaced outward projections extend radially outwardly into the annulus from the inner pipe and are movable longitudinally relative to the outer pipe. A corresponding series of longitudinally spaced inward projections extend radially inwardly into the annulus from the outer pipe and are movable longitudinally relative to the inner pipe. When the inner pipe is subject to thermal elongation or contraction in use of the pipeline, the inner pipe is movable longitudinally relative to the outer pipe, hence moving outward projections between and relative to inward projections. The pipeline can be buried to restrain the outer pipe. The annulus can be flooded, in which case the inner pipe is covered with wet insulation.

11 Claims, 4 Drawing Sheets

(51) Int. Cl.

| | | |
|---|---|---|
| *F16L 9/18* | (2006.01) | |
| *F16L 13/02* | (2006.01) | |
| *F16L 39/00* | (2006.01) | |
| *F16L 39/04* | (2006.01) | |
| *F16L 51/00* | (2006.01) | |
| *F16L 59/147* | (2006.01) | |
| *F16L 1/16* | (2006.01) | |

(52) U.S. Cl.

CPC ............. *F16L 39/005* (2013.01); *F16L 39/04* (2013.01); *F16L 51/00* (2013.01); *F16L 59/147* (2013.01); *F16L 1/16* (2013.01)

(58) Field of Classification Search

CPC . F16L 51/00; F16L 59/147; F16L 1/19; F16L 39/00

USPC ...................... 285/32, 145.1–145.4, 298–303

See application file for complete search history.

(56) References Cited

FOREIGN PATENT DOCUMENTS

| KR | 20140043611 | 4/2014 | |
|---|---|---|---|
| WO | WO 02/33301 | 4/2002 | |
| WO | WO-2009083937 A2 * | 7/2009 | ................ F16L 1/19 |
| WO | WO 2019/150022 | 8/2019 | |

\* cited by examiner

MITIGATION OF BUCKLING IN SUBSEA PIPE-IN-PIPE SYSTEMS

This invention relates to the challenges of mitigating or controlling buckling during the installation and operation of subsea pipelines. The invention is particularly concerned with pipelines that have a pipe-in-pipe (PiP) configuration.

A PiP assembly comprises an inner flowline pipe that is disposed concentrically within an outer pipe to define a thermally-insulating annulus between them. Usually the annulus is filled with a gas such as air, which may be under a partial vacuum, and/or a thermally-insulating material such as an aerogel.

Subsea pipelines are used as 'tie-backs' to transport crude oil and/or natural gas from a subsea wellhead across the seabed on the way to the surface. Typically, in offshore locations, the oil and/or gas flows up a riser from the seabed to the surface to undergo treatment and temporary storage at a surface installation.

Oil and gas are present in subterranean formations at elevated temperature and pressure, which may be increased by the injection of hot fluids such as steam. On production of the oil or gas, the hot produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The thermal loads experienced by a subsea pipeline in use give rise to large axial forces in the pipe wall, especially when starting production or between shutting-down and restarting production. In particular, a pipeline that is subjected to an increase in temperature will tend to extend longitudinally. Resistance to thermal elongation due to friction and cohesion between the exterior of the pipeline and the seabed soil results in axial compressive forces in the pipe wall which, in a long pipeline, can only be relieved by horizontal or vertical deflection, or buckling.

Various methods are known to mitigate or control the appearance of buckles in subsea pipelines. For example, buckle arresters may be inserted into a pipeline as described in WO 02/33301. However, buckle arresters merely deal with the consequences of buckling rather than preventing buckles at source.

Some pipelines are designed to buckle at certain points along their length. In this respect, common approaches to mitigate buckling are to lay a pipeline along a sinuously-curved route or to incorporate expansion loops along the length of the pipeline, for example upon sleepers onto which the pipeline is laid. Creating curves or loops in the pipeline layout absorbs compressive forces and promotes the appearance of buckles in a controlled manner at selected locations.

Disadvantageously, however, these solutions lengthen the pipeline substantially and also lengthen the installation process, both of which add greatly to the cost of installation. Also, again, they merely deal with the consequences of buckling rather than preventing buckles at source.

Another way of mitigating buckling is to anchor the pipeline in some fashion. In this respect, it is well known that a pipeline laid openly on the seabed can experience upheaval buckling in which bending strain may exceed allowable limits, especially if strain is concentrated around one longitudinal location by the effect of localisation. This form of buckling may be prevented by covering the pipeline, for example with concrete mats or by burying the pipeline in a backfilled trench. Trenching has the advantages of protecting the pipeline and adding to its thermal insulation.

In the case of a PiP assembly, however, the inner pipe is particularly susceptible to buckling. Buckling of the inner pipe is especially prevalent where the pipeline is anchored or restrained in some way, for example by being buried in a trench.

The conventional approach to mitigating buckling of the inner pipe of a PiP system has been to lock the inner pipe against longitudinal movement relative to the outer pipe. For example, longitudinally-spaced forged steel bulkheads extending across the annulus between the inner and outer pipes may connect those pipes at intervals to transmit and share axial forces between them, in addition to sealing intervening sections of the annulus. However, steel bulkheads create thermal bridges between the inner and outer pipes that create cold spots by bypassing the thermal insulation of the annulus.

US 2018/051539 describes a PiP assembly including a bulkhead comprising a pair of projections that extend from the inner and outer pipes into the annulus. The projections are joined together in the annulus by a mass of elastomeric filler material. The filler material provides a seal between adjacent sections of the pipeline and transmits axial forces between the inner and outer pipes, while also reducing the thermal conductivity of the bulkhead compared to a conventional steel bulkhead.

WO 2019/150022 replaces a bulkhead with thermally-insulating polymeric blocking wedges. The wedges are installed between successive pipe sections when fabricating a PiP assembly on an upright axis during J-lay operations. When installed, the wedges are trapped between respective longitudinally-opposed shoulders of a recess in the inner surface of the outer pipe and an integral circumferential ridge or collar that extends radially outwardly into the annulus from the inner pipe. In this way, the wedges lock the inner pipe relative to the outer pipe in the same manner as a bulkhead.

Whilst the wedges of WO 2019/150022 address the issue of thermal bridging, accommodating them between the shoulders and the collar requires the pipe sections to have complex interface formations. For example, the recess requires the outer diameter of the outer pipe to be increased locally to maintain the necessary wall thickness. The recess also requires the provision of an additional separation ring that is received telescopically within an outer pipe section added to the top of the pipe string.

More generally, collars around the inner and outer pipes are known to facilitate handling of PiP assemblies in upright lay towers. For example, in U.S. Pat. No. 6,179,523, the outer pipe has external collars and the inner pipe has outer collars that serve as spacers or centralisers acting between the inner and outer pipes. The outer collars of the inner pipe also engage an outer pipe joint frictionally so as to support the outer pipe joint during assembly in J-lay operations. However, frictional engagement is not sufficient to support the weight of the pipeline catenary that is suspended between the installation vessel and the seabed.

Against this background, the invention may be expressed as a subsea pipeline of pipe-in-pipe configuration, comprising: an inner pipe; an outer pipe spaced radially from the inner pipe; an annulus defined by the radial spacing between the inner and outer pipes; a series of longitudinally-spaced outward projections that extend radially outwardly into the annulus from the inner pipe and that are movable longitudinally relative to the outer pipe; and a series of longitudinally-spaced inward projections that extend radially inwardly into the annulus from the outer pipe and that are movable longitudinally relative to the inner pipe; wherein, in use of the pipeline, the inner pipe is movable longitudinally relative to the outer pipe, hence moving the outward projections between and relative to the inward projections.

By interlocking abutment of the inward projections with the outward projections, the longitudinal spacing between the inward and outward projections preferably defines a range of longitudinal movement of the inner pipe relative to the outer pipe. That range of relative longitudinal movement may be delimited by a first position in which the inward projections bear against first faces of the outward projections and a second position in which the inward projections bear against second faces of the outward projections, opposed longitudinally to the first faces.

Conveniently, the inward and/or outward projections may substantially centralise the inner pipe within the outer pipe. Nevertheless, longitudinally-spaced centralisers may extend radially across the annulus between the inner and outer pipes.

A low-friction coating may be provided on the inward and/or outward projections. Similarly, rollers may be mounted on the inward and/or outward projections.

There may be at least one layer of thermal insulation on the inner pipe. For example, the thermal insulation may be wet insulation and the annulus may be filled with water. Thus, the annulus may be in fluid communication with a body of water surrounding the pipeline. Elegantly, the outward projections may be integral with the layer of thermal insulation material.

The pipeline of the invention is apt to be covered to fix the outer pipe relative to the seabed. For example, the pipeline may be buried to its full diameter in a seabed trench.

The inventive concept embraces a corresponding method of operating a subsea pipeline of pipe-in-pipe configuration comprising an outer pipe spaced radially from an inner pipe by an annulus. The method comprises: causing thermal expansion or contraction of the inner pipe relative to the outer pipe; permitting said relative expansion or contraction of the inner pipe within a range of relative longitudinal movement; and limiting said range of relative longitudinal movement by bringing interlocking projections of the inner and outer pipes into mutual abutment in the annulus.

The range of relative longitudinal movement may be limited between a first position in which inward projections of the outer pipe bear against first faces of outward projections of the inner pipe and a second position in which the inward projections bear against second faces of the outward projections, opposed longitudinally to the first faces.

Corresponding expansion or contraction of the outer pipe may be constrained, for example by covering or fully burying the pipeline to fix the outer pipe relative to the seabed.

The inner pipe may be thermally insulated with water that fills the annulus and/or with wet insulation.

At least some of the interlocking projections may be used to centralise the inner pipe within the outer pipe.

The inventive concept also extends to a method of fabricating a subsea pipeline of pipe-in-pipe configuration comprising an outer pipe spaced radially from an inner pipe by an annulus. The method comprises: supporting the outer pipe by a hang-off system of an installation vessel; supporting the inner pipe by mutual engagement between interlocking projections of the inner and outer pipes within the annulus; pulling an end portion of the inner pipe out from an end of the outer pipe, hence disengaging the interlocking projections; and welding a new inner pipe joint to the end portion of the inner pipe.

The end portion of the inner pipe may be returned into the end of the outer pipe after welding the new inner pipe joint to the end portion of the inner pipe, hence reengaging the interlocking projections. A new outer pipe joint may then be welded to the end of the outer pipe.

In summary, the invention addresses the challenges of buckle mitigation in a subsea pipeline, especially a buried subsea pipeline, under constraints of pressure and/or temperature. In these conditions, a fully-restrained pipeline could experience a huge axial compressive force due to friction and/or cohesion with the seabed soil and thermal expansion of the pipe wall.

The invention aims to reduce the fully-restrained force arising from friction and cohesion acting on an outer pipe and thermal expansion acting on an inner pipe of a PiP system. Thus, the invention reduces the compressive forces acting on the inner flowline pipe of a PiP system by increasing the possibility for the flowline pipe to elongate thermally without mobilising friction.

In a PiP system of the invention, an inner pipe serving as a main or flowline pipe is inserted into an outer pipe. The primary purpose of the outer pipe is to support the inner pipe for relative longitudinal movement. The secondary purpose of the outer pipe is to define an annulus that contributes to thermal insulation. The outer pipe interacts with the soil while the inner pipe slides freely relative to the outer pipe, driven by thermal expansion or contraction, with minimal frictional resistance. For this purpose, rolling bearings, spacers or centralisers made of low-friction material may be installed in the annulus between the inner and outer pipes at regular longitudinal intervals.

There is no need for bulkheads connecting the inner and outer pipes together, for example at their ends. It would also be possible for there to be a bulkhead at one end of the pipeline and no bulkhead at the opposite end of the pipeline. Thus, the annulus between the pipes need not be watertight although it could be made watertight if desired. In this respect, a reduction in thermal insulation due to flooding the annulus may be offset by burying the pipeline, for example in a backfilled trench, without suffering consequential buckling of the inner pipe. Also, the inner pipe can be wet-insulated, for example with a polypropylene coating, or may be insulated with other materials so as to limit heat transfer between the inner and outer pipes.

Embodiments of the invention implement a method to control maximum expansion in the inner pipe of a PiP assembly, which assembly may optionally be buried in the seabed. The method comprises arranging stoppers such as mutually-opposing teeth on the outer wall of the inner pipe and the inner wall of the outer pipe. The stoppers are generally spaced apart but can abut when the maximum thermal expansion is reached.

The stoppers may be collars, may be integral with the pipes or may be welded to or otherwise attached to the pipes The PiP assembly may comprise low-friction spacers or rolling spacers between the inner pipe and the outer pipe. The stoppers themselves could serve as spacers.

The inventive concept also enables a method to assemble a PiP assembly in an upright tower, the method comprising: providing inner pipes with outer stoppers and outer pipes with inner stoppers; supporting an outer pipeline catenary by a hang-off system; supporting an inner pipeline catenary via the stoppers; welding a new outer pipe to the top of the outer pipeline catenary; lowering the PiP assembly; pulling up the inner catenary assembly; and welding a new inner pipe to the top of the inner pipeline catenary.

In summary, a series of longitudinally-spaced outward projections extend radially outwardly into the annulus from the inner pipe of a PiP assembly and are movable longitudinally relative to the outer pipe of the PiP assembly. A corresponding series of longitudinally-spaced inward projections extend radially inwardly into the annulus from the outer pipe of the PiP assembly and are movable longitudinally relative to the inner pipe of the PiP assembly.

When the inner pipe is subject to thermal elongation or contraction in use of the pipeline, the inner pipe is movable longitudinally relative to the outer pipe, hence moving the outward projections between and relative to the inward projections. The pipeline may be buried to restrain the outer pipe. The annulus may be flooded, in which case the inner pipe is suitably covered with wet insulation.

In order that the invention may be more readily understood, reference will now be made, by way of example, to the accompanying drawings in which.

Figure 1:
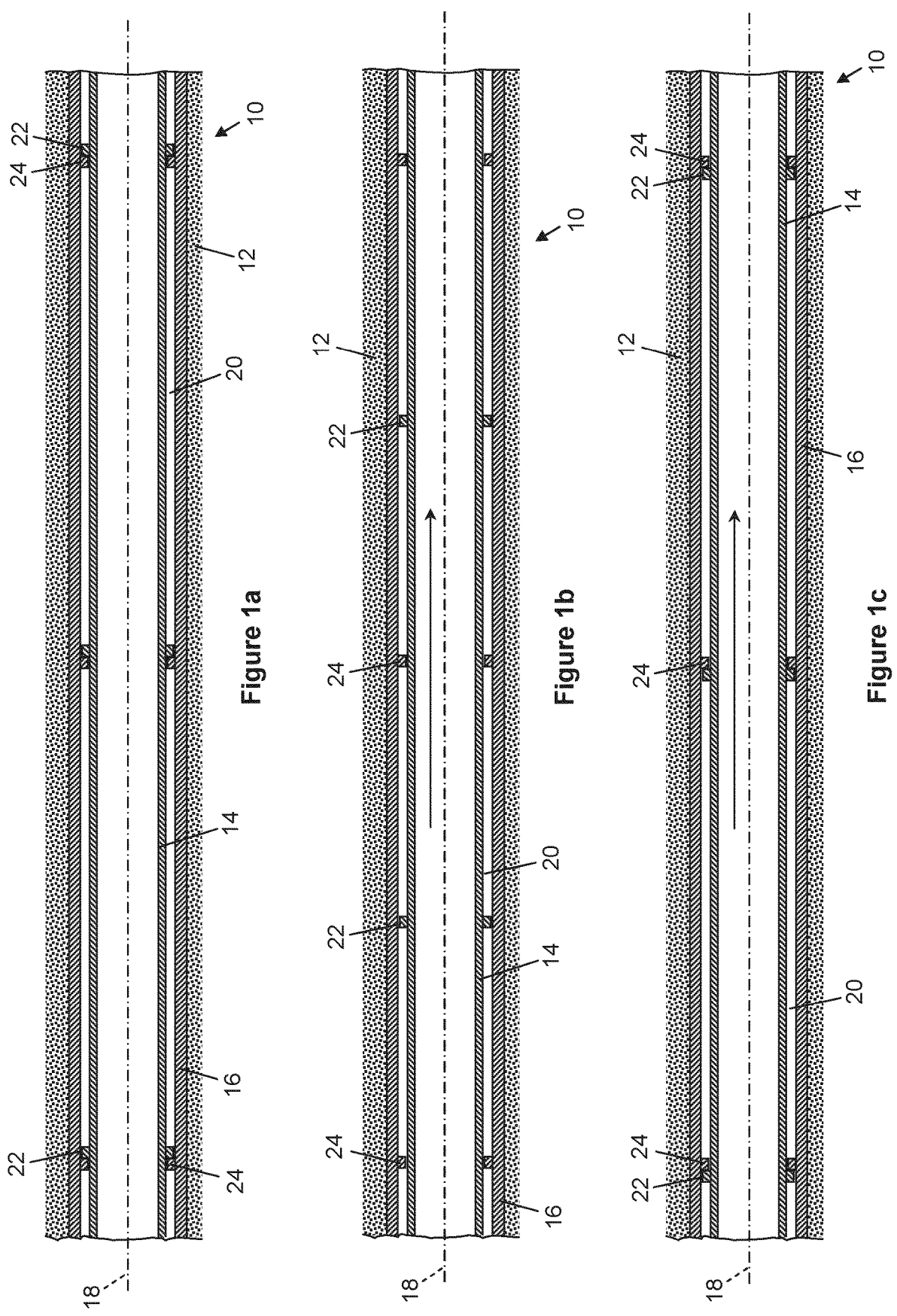
FIGS. 1a, 1b and 1c are a sequence of a side views of a PiP pipeline of the invention in longitudinal section, when buried in a subsea trench and responding to thermal stress in use.

The drawings are schematic and are not to scale. In particular, the pipelines shown in the drawings have been shortened longitudinally to illustrate the principles of the invention more clearly.

Referring firstly to FIGS. 1a to 1c, a PiP pipeline 10 of the invention is shown here covered to constrain the pipeline 10 against buckling. In this example, the pipeline 10 has been covered by being buried in soil of the seabed 12, for example in a backfilled trench.

As is conventional, the pipeline 10 comprises an inner pipe 14 and an outer pipe 16 that are in concentric relation about a common central longitudinal axis 18. The inner pipe 14 serves as a flowline for hot fluids such as hydrocarbon production fluids. The inner pipe 14 is therefore held spaced apart from the outer pipe 16 to define a thermally-insulating annulus 20 between them. The annulus 20 may contain a thermally-insulating material wrapped around or layered onto the inner pipe 14, although such a material has been omitted from these drawings for clarity.

The inner and outer pipes 14, 16 are both conventionally fabricated of steel, although either or both of them could instead be made of a fibre-reinforced polymer composite material such as a thermoplastic composite pipe. Both steel pipes and composite pipes are regarded in the art as nominally rigid pipes, albeit that they are routinely bent along their length during installation and in use. Rigid pipes are distinguished in the art from flexible pipes such as unbonded flexible pipelines that have a layered wall structure of steel reinforcements alternating with flexible impermeable membranes. Relative to rigid pipes, flexible pipes have a much smaller minimum bending radius and they experience minimal elastic recovery once they are bent along their length.

The inner pipe 14 has a series of longitudinally-spaced external rings or outward projections 22 that project radially outwardly from its outer face into the annulus 20. The outward projections 22 are equi-spaced along the length of the inner pipe 14. Each outward projection 22 extends circumferentially around the inner pipe 14 and preferably extends continuously around the inner pipe 14 like an external flange or collar.

Correspondingly, the outer pipe 16 has a series of longitudinally-spaced internal rings or inward projections 24 that project radially inwardly from its inner face into the annulus 20. The inward projections 24 are equi-spaced along the length of the outer pipe 16, with spacing corresponding to the spacing between the outward projections 22 of the inner pipe 14. Each inward projection 24 extends circumferentially, and preferably continuously, within the outer pipe 16 like an internal flange or collar.

The outward and inward projections 22, 24 may be integral with the respective pipes 14, 16, especially in the case of composite pipes, or may be attached to the respective pipes 14, 16, for example by clamping, overmoulding, adhesive bonding or welding. The projections 22, 24 may be of steel, polymer or a reinforced polymer.

The outward and inward projections 22, 24 project far enough into the annulus 20 in their respective radial directions that there is an interlocking radial overlap between their confronting facing surfaces. Thus, the radially outermost point of each outward projection 22 lies on a greater circumference than the radially innermost point of each inward projection 24. In other words, the radially outermost point of the outward projection 22 is radially outboard of the radially innermost point of the inward projection 24.

Neither projection 22, 24 needs to extend across the full radial depth of the annulus 20. Thus, the radially outermost point of the outward projection 22 may be spaced from the inner face of the outer pipe 16 and/or the radially innermost point of the inward projection 24 may be spaced from the outer face of the inner pipe 14. The clearance is sufficient to ensure a sliding fit between the projections 22, 24 and the opposed surfaces of the pipes 14, 16, while still ensuring substantial concentricity between the pipes 14, 16.

To give clearance for their interlocking overlap, the outward and inward projections 22, 24 are offset longitudinally from each other along the central longitudinal axis 18. Thus, the outward and inward projections 22, 24 alternate with each other moving lengthwise along the pipeline 10. The radially-overlapping facing surfaces of the projections 22, 24 confront each other within the annulus 20.

By virtue of the invention, the inner pipe 14 can move longitudinally within and relative to the outer pipe 16. In this respect, when the pipeline 10 is covered or buried as shown in these drawings, the outer pipe 16 is substantially fixed or restrained relative to the seabed 12 and hence the inward projections 24 remain substantially stationary. To avoid massive compressive stresses in the inner pipe 14 due to thermal expansion, the inner pipe 14 is free to move within a range of longitudinal movement that is illustrated in FIGS. 1a to 1c.

Specifically: FIG. 1a shows the outward projections 22 abutting the corresponding inward projections 24; FIG. 1b shows the outward projections 22 in an intermediate longitudinal position, carried away from the inward projections 24 by thermal elongation of the inner pipe 14 and hence now positioned between successive inward projections 24 of the series; and FIG. 1c shows the outward projections 22 abutting the next inward projections 24 of the series but on the longitudinally-opposite side.

It will be apparent that the positions of abutting contact between the projections 22, 24 shown in FIGS. 1a and 1c define the extremes of movement of the inner pipe 14 relative to the outer pipe 16. Thus, the positions of abutting contact between the projections 22, 24 define the threshold at which further thermal elongation or contraction of the inner pipe 14 will be resisted or prevented by transferring longitudinal loads from the inner pipe 14 to the outer pipe 16.

In the arrangement exemplified here with a fully-restrained outer pipe 16, the inward projections 24 of the outer pipe 16 therefore serve as stoppers to limit longitudinal movement of the outward projections 22 of the inner pipe 14. However in other arrangements, either type of projection 22, 24 could serve as a stopper for the other type of projection 22, 24.

The outward and inward projections 22, 24 serve as spacers or centralisers to define the annulus 20 and to maintain concentricity between the pipes 14, 16. However, additional conventional centralisers or spacers 26 may be provided on the inner pipe 14 between successive projections 22, 24 as shown in FIG. 2.

Figures 2, 3:
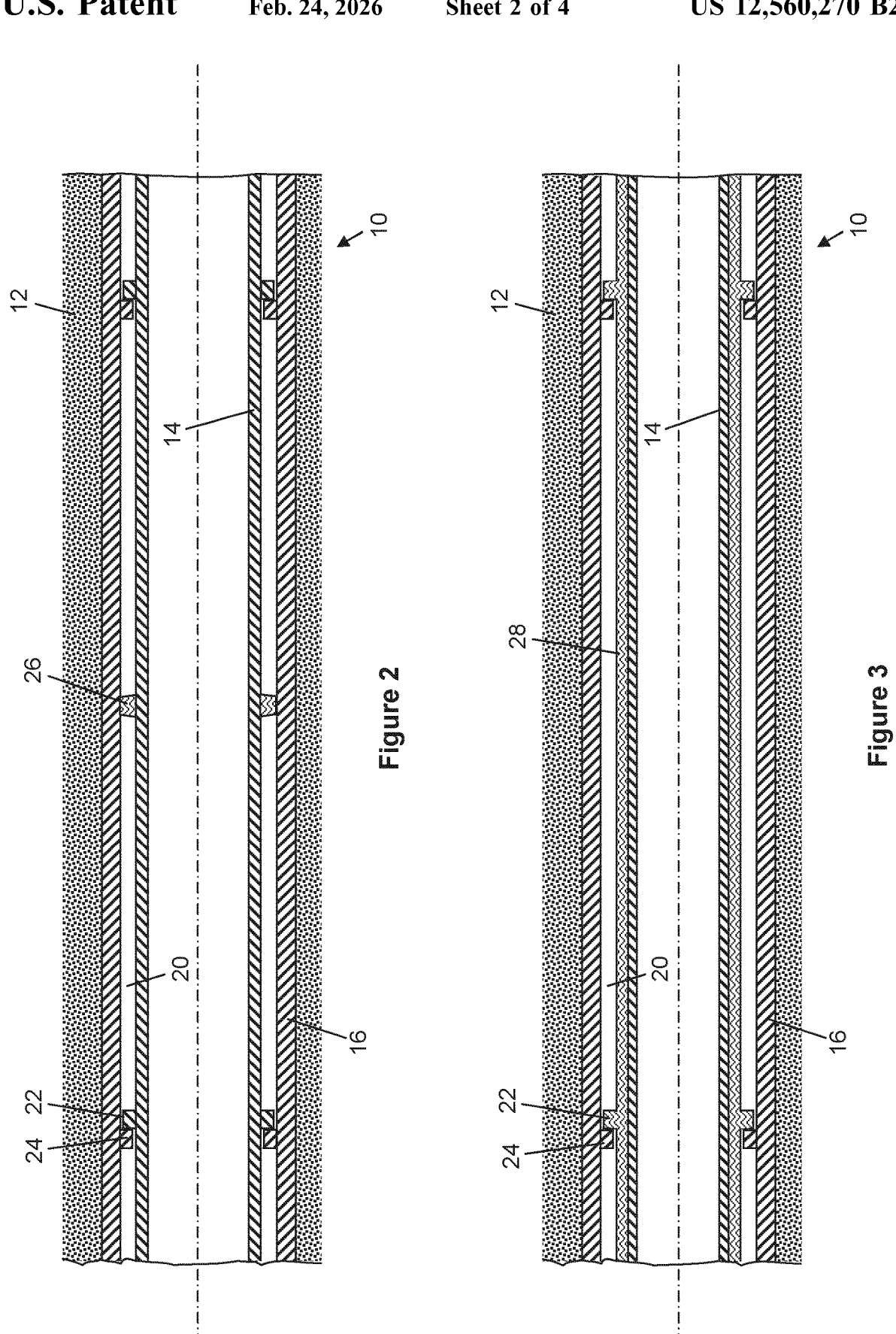
FIG. 2 is an enlarged sectional side view of a variant of the pipeline of FIG. 1.
FIG. 3 is an enlarged sectional side view of another variant of the pipeline of FIG. 1.

Moving on to FIG. 3, this illustrates a variant in which the inner pipe 14 is coated with a thermally-insulating coating 28 of, for example, polypropylene. In this example, the outward projections 22 are moulded integrally with, or overmoulded onto, the coating 28.

Those skilled in the art will know that a polymeric coating 28 such as that shown in FIG. 3 is apt to be used as wet insulation, hence being in direct contact with seawater. Typically in the art, wet insulation is used on the exterior of single-wall pipelines. In this instance, however, the coating 28 can serve as wet insulation on the exterior of the inner pipe 14 of a PiP system. Thus, the annulus 20 can be flooded with water and there is therefore no need for bulkheads, or at least there is no need to seal the annulus between a pair of bulkheads. Advantageously, water trapped in the annulus 20 within the outer pipe 16 will add a thermally insulating effect to the wet insulation provided by the coating 28.

Figure 4:
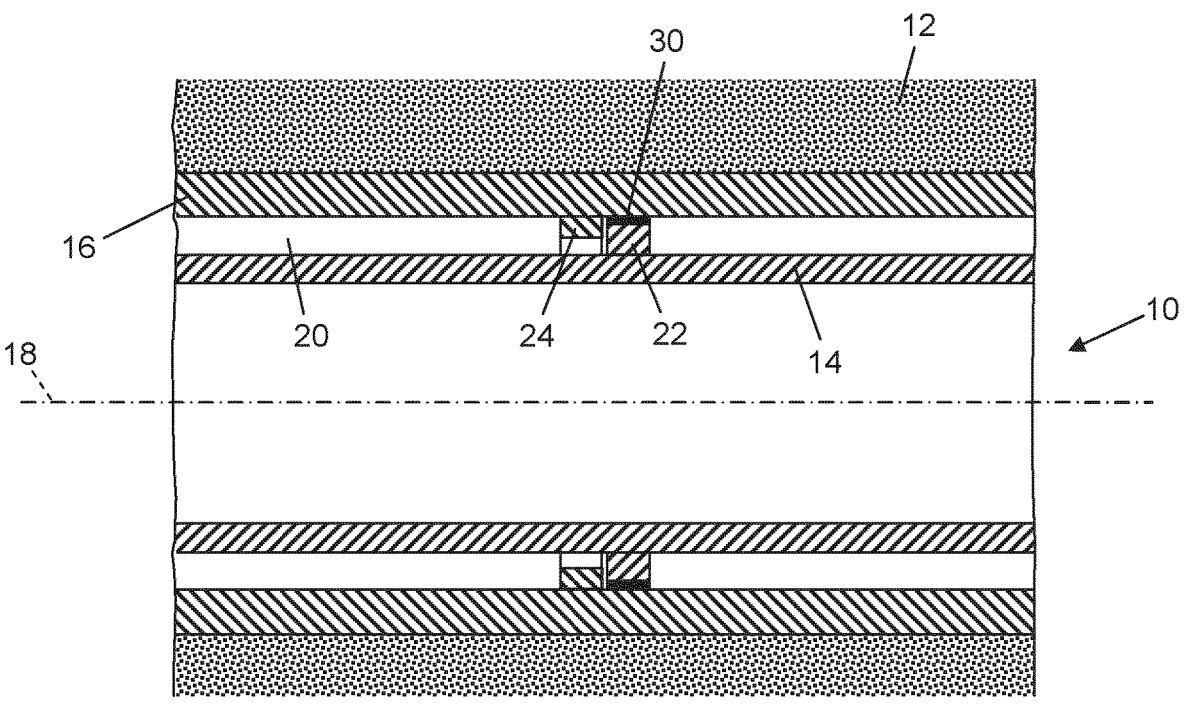
FIG. 4 is a detail view of another variant of the pipeline of FIG. 1, in longitudinal section.

FIG. 4 shows that the outward projection 22 may present a low-friction surface 30, for example of PTFE, to the inner face of the outer pipe 16. Here, the inward projection 24 serves only as a stop formation for the outward projection 22, which extends across substantially the full radial depth of the annulus 20. It would be possible to reverse the arrangement shown in FIG. 4 by providing the low-friction surface 30 instead on an inward projection 24 that extends across substantially the full radial depth of the annulus 20 to slide along the outer face of the inner pipe 14.

Figure 5:
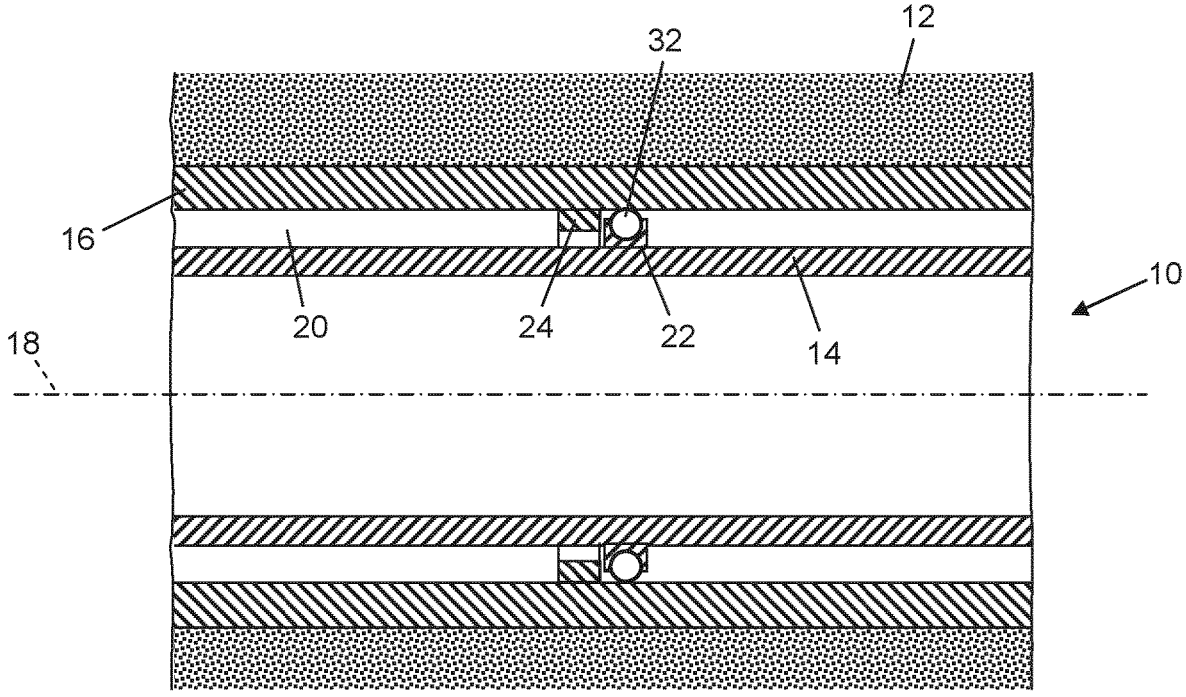
FIG. 5 is a detail view of another variant of the pipeline of FIG. 1, in longitudinal section.

FIG. 5 shows that rolling contact is also possible to reduce friction between a projection 22, 24 and the opposed pipe 14, 16. In this example, the outward projection 22 is provided with wheels or rollers 32 that roll along the inner face of the outer pipe 16. Conversely, it would also be possible for the inward projection 24 to have similar provisions so as to roll along the outer face of the inner pipe 14.

Figures 6A, 6B, 6C:
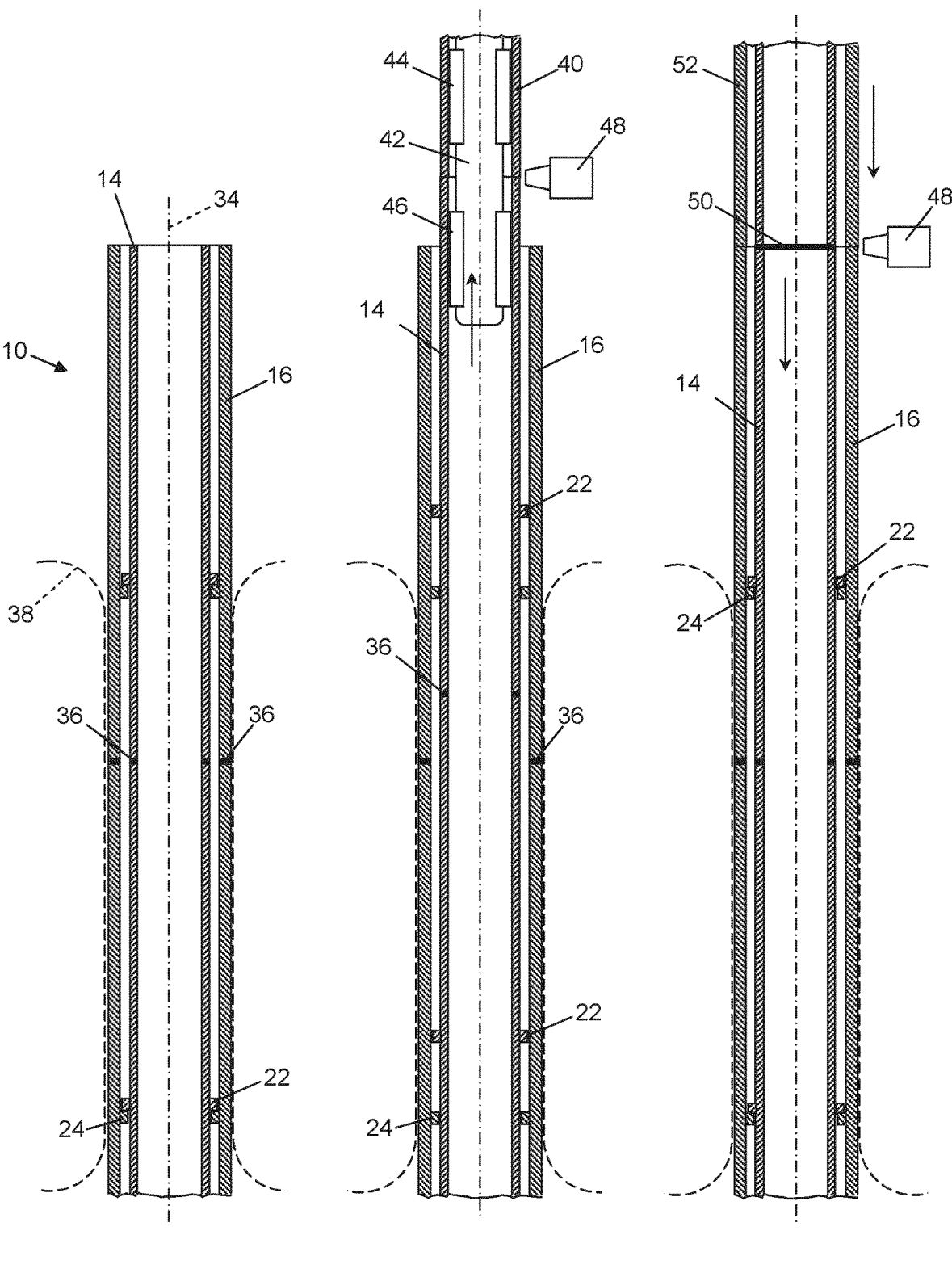
FIGS. 6a, 6b and 6c are a sequence of a side views of a PiP pipeline of the invention in longitudinal section, being fabricated during a J-lay operation.

Turning finally to FIGS. 6a to 6c, these drawings show how a pipeline 10 of the invention may be fabricated from a succession of pipe joints offshore. In this example, the pipeline 10 is being fabricated aboard an installation vessel by a J-lay method on an upright axis 34 that may be substantially vertical as shown. Previous welds 36 between successive pipe joints of the inner and outer pipes 14, 16 are shown.

As is conventional, the weight of the pipeline 10 suspended between the vessel and the seabed is supported by a hold-back system 38 of the vessel comprising a clamp and/or tensioners as exemplified here. Such a hold-back system 38 can only act on the outer pipe 16; the weight of the inner pipe 14 must be supported by other means.

Conveniently, in accordance with the invention, the weight of the inner pipe 14 is supported by an interlocking action between the outward projections 22 of the inner pipe 14 and the underlying inward projections 24 of the outer pipe 16. In effect, the outward projections 22, and hence the inner pipe 14, are hung on the inward projections.

In FIGS. 6a to 6c, the inner and outer pipes 14, 16 are longitudinally aligned and therefore are coterminous, hence with their upper ends at the same horizontal level, when the outward projections 22 rest on the inward projections 24 as shown in FIGS. 6a and 6c.

FIG. 6b shows a new inner pipe joint 40 being added to the top of the inner pipe 14. The inner pipe joint 40 contains an internal line-up clamp 42. The line-up clamp 42 is temporarily fixed to the inner pipe joint 40 by upper clamp shoes 44 that are extended radially outwardly against the inner face of the inner pipe joint 40.

A portion of the line-up clamp 42 protruding downwardly from the inner pipe joint 40 is inserted into the open top of the inner pipe 14. Once fully inserted into the top of the inner pipe 14, lower clamp shoes 46 of the line-up clamp 42 are extended radially outwardly against the inner face of the inner pipe 14. In this way, the line-up clamp 42 aligns the inner pipe joint 40 with the top of the inner pipe 14 and holds them together for circumferential butt-welding around their mutual interface.

FIG. 6b shows the line-up clamp 42 raised to lift the inner pipe joint 40 and the inner pipe 14 relative to the outer pipe 16. The top of the inner pipe 14 then protrudes above the top of the outer pipe 16 to allow access to a welding head 48 for forming a weld at the interface between the inner pipe joint 40 and the top of the inner pipe 14.

After the weld 50 between the inner pipe joint 40 and the top of the inner pipe 14 has been completed, tested and coated, the line-up clamp 42 is lowered to transfer the weight of the thus-extended inner pipe 14 back onto the interlocking projections. The line-up clamp 42 can then be removed. A new outer pipe joint 52 is then lowered onto the top of the outer pipe 16 as shown in FIG. 6c, which also shows a welding head 48 forming a weld around their mutual interface.

When the weld between the outer pipe joint 52 and the outer pipe 16 is completed, the hold-back system 38 lowers the thus-extended pipeline 10 to allow the process to be repeated with the next new inner and outer pipe joints 40, 52.

The invention claimed is:
1. A subsea pipeline of pipe in pipe configuration, comprising:
    an inner pipe;
    an outer pipe spaced radially from the inner pipe;

an annulus defined by the radial spacing between the inner and outer pipes;

a series of longitudinally spaced outward projections that extend radially outwardly into the annulus from the inner pipe and that are movable longitudinally relative to the outer pipe, wherein the outward projections are equi-spaced along the length of the inner pipe; and a series of longitudinally spaced inward projections that extend radially inwardly into the annulus from the outer pipe and that are movable longitudinally relative to the inner pipe, wherein the inward projections are equi-spaced along the length of the outer pipe, and wherein the longitudinal spacing between successive inward projections is substantially equal to the longitudinal spacing between successive outward projections;

wherein, in use of the pipeline, the inner pipe is movable longitudinally relative to the outer pipe, hence moving the outward projections between and relative to the inward projections;

wherein the longitudinal spacing between the inward and outward projections defines, by interlocking abutment of the inward projections with the outward projections, a range of said longitudinal movement of the inner pipe relative to the outer pipe, said range of relative longitudinal movement being delimited by a first position in which the inward projections bear against first faces of the outward projections and a second position in which the inward projections bear against second faces of the outward projections opposed longitudinally to the first faces.

2. The pipeline of claim 1, wherein the inward and/or outward projections substantially centralise the inner pipe within the outer pipe.

3. The pipeline of claim 1, further comprising longitudinally spaced centralisers that extend radially across the annulus between the inner and outer pipes.

4. The pipeline of claim 1, further comprising a low friction coating on the inward and/or outward projections.

5. The pipeline of claim 1, further comprising rollers mounted on the inward and/or outward projections.

6. The pipeline of claim 1, further comprising at least one layer of thermal insulation on the inner pipe.

7. The pipeline of claim 6, wherein the thermal insulation is wet insulation and the annulus is filled with water.

8. The pipeline of claim 7, wherein the annulus is in fluid communication with a body of water surrounding the pipeline.

9. The pipeline of claim 6, wherein the outward projections are integral with the at least one layer of thermal insulation material.

10. The pipeline of claim 1, wherein the pipeline is covered to fix the outer pipe relative to the seabed.

11. The pipeline of claim 10, wherein the pipeline is buried to its full diameter in a seabed trench.

* * * * *